United States Patent
Yang

(10) Patent No.: US 7,383,469 B2
(45) Date of Patent: Jun. 3, 2008

(54) APPLICATION MANAGEMENT SYSTEM AND METHOD

(75) Inventor: Li-Yen Yang, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 760 days.

(21) Appl. No.: 10/747,492

(22) Filed: Dec. 29, 2003

(65) Prior Publication Data

US 2004/0261075 A1    Dec. 23, 2004

(30) Foreign Application Priority Data

Jun. 17, 2003    (TW) .............................. 92116349 A

(51) Int. Cl.
*G06F 11/00*    (2006.01)

(52) U.S. Cl. ............................ 714/36; 714/11; 714/23; 714/25; 714/38; 714/51

(58) Field of Classification Search ................ 714/11, 714/23, 25, 36, 38, 51
See application file for complete search history.

(56) References Cited

U.S. PATENT DOCUMENTS

| 5,530,802 A * | 6/1996 | Fuchs et al. ................ 714/17 |
| 5,715,386 A * | 2/1998 | Fulton et al. ................ 714/38 |
| 6,425,093 B1 * | 7/2002 | Singh et al. ................ 714/38 |
| 7,017,082 B1 * | 3/2006 | Yip et al. ..................... 714/38 |
| 2004/0078686 A1 * | 4/2004 | Toyooka et al. ............. 714/38 |
| 2004/0153823 A1 * | 8/2004 | Ansari ......................... 714/38 |

\* cited by examiner

*Primary Examiner*—Robert Beausoliel
*Assistant Examiner*—Charles Ehne
(74) *Attorney, Agent, or Firm*—Thomas, Kayden, Horstemeyer & Risley

(57) ABSTRACT

An application management system and method is proposed. The application management system includes a first processor and a second processor. The first processor executes an application in a computer system. The second processor includes a monitor module to monitor the execution status of the application. If the execution status of the application is abnormal, the monitor module enables the computer system to reboot, and uses the first processor to re-execute the application.

14 Claims, 2 Drawing Sheets

APPLICATION MANAGEMENT SYSTEM
AND METHOD

BACKGROUND OF THE INVENTION

1. Field of the Invention

The present invention relates to an application management system and method, and particularly to a system and method that monitors the execution status of a computer system application using an additional microprocessor.

2. Description of the Related Art

In addition to the functions provided by a conventional computer, most current computer systems have integrated facilities attained by various peripheral electronic appliances, such as CD/MP3 player, VCD/DVD player, TV and image explorer.

Current computer systems can satisfy the demands of users for the purpose of entertainment. The operating system of a computer can execute numerous multimedia software, such as music player, video player, TV player, radio (AM/FM) broadcaster, image capturer and explorer, and video/audio recording programs, and perform associated multimedia functions using related electronic appliances and corresponding drivers.

In practice, the computer system generally functions solely as an electronic multimedia device. That is, only related applications and peripheral hardware specific to a selected multimedia function are used, with other software and hardware elements of the computer system not being required. Under a common situation, if an application specific to a selected operation mode is under an abnormal condition, for example, the computer system is hanged up due to unknown problems while the application is running, users must keep waiting for system response. If the computer system crashes, users are unable to deal with the hang problem, thereby reducing the efficacy of the computer system.

SUMMARY OF THE INVENTION

It is therefore an object of the present invention to provide an application management system and method that monitors the execution status of a computer system application using an additional microprocessor.

To achieve the above object, the present invention provides an application management system and method. The application management system according to the present invention includes a first processor and a second processor. The first processor executes an application in a computer system. The second processor includes a monitor module to monitor the execution status of the application. If the execution of the application is under an abnormal condition, the monitor module enables the computer system to reboot, and uses the first processor to re-execute the application.

The application management method according to the present invention uses the first processor to execute an application. Then, a monitor module of a second processor monitors the execution status of the application. If the execution of the application is under an abnormal condition, the monitor module enables the computer system to reboot, and uses the first processor to re-execute the application.

The application is configured to send a surviving signal to the monitor module of the second processor within a first predetermined time interval to notify the computer system that it is working normally. If the monitor module does not receive the surviving signal from the application within a second predetermined time interval, the monitor module determines that the execution status of the application becomes abnormal. In addition, the monitor module may send a confirmation signal to the application when the first predetermined time interval is reached, and the application may return a surviving signal to the monitor module in response to the confirmation signal. If the monitor module does not receive the surviving signal from the application within the second predetermined time interval, the monitor module determines that the execution status of the application becomes abnormal.

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
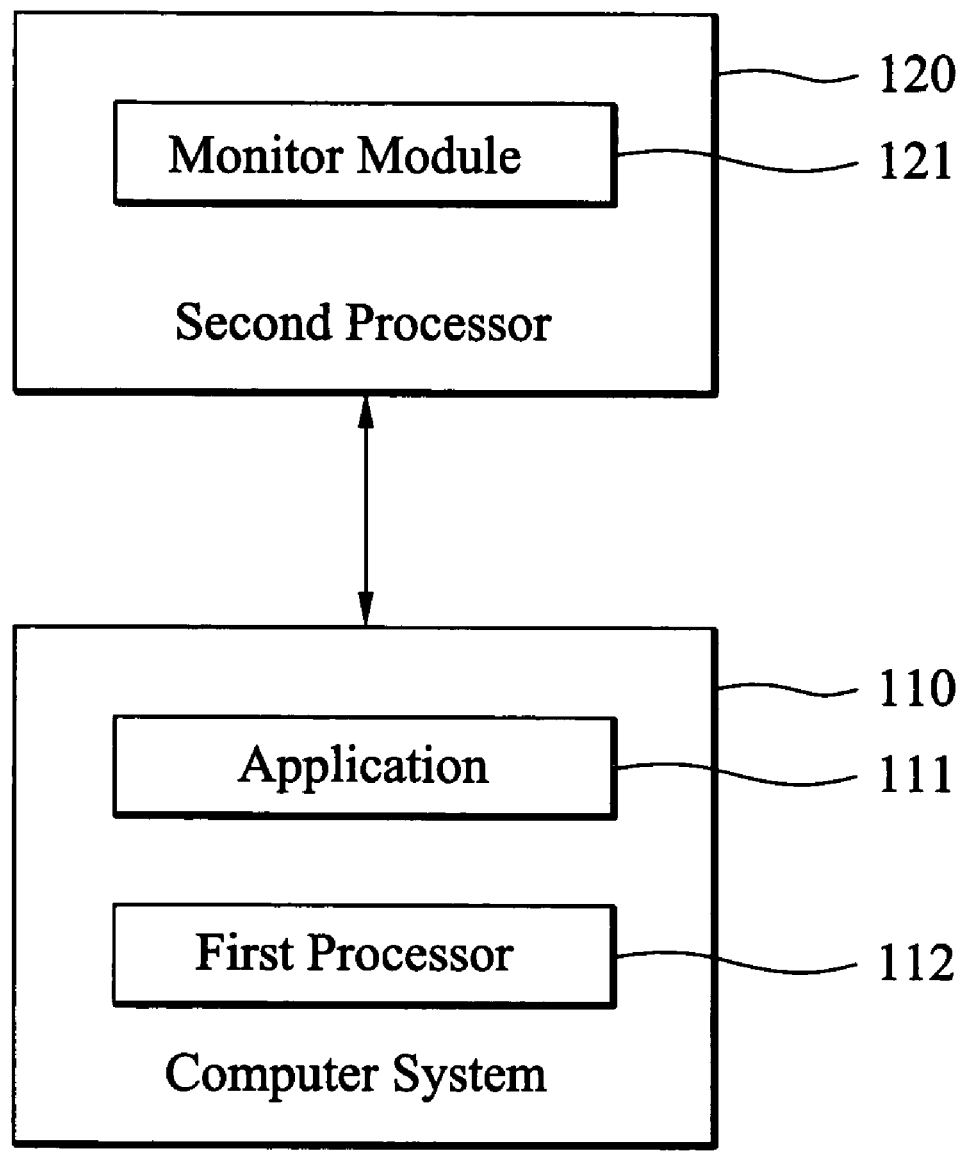
FIG. 1 is a schematic diagram illustrating the architecture of the application management system according to the present invention.

FIG. 1 illustrates the architecture of the application management system according to the present invention.

The application management system 100 according to the present invention includes a computer system 110 and a second processor 120. The computer system 110 includes a first processor 112 to execute an application 111. Note that the application may be a specific application corresponding to one of the operating modes available in the computer system 110. The computer system 110 may operate in a normal PC mode under the control of a complete version of an operating system, or operate in a sub-mode being determined by selecting an entry of a multimedia operation mode class that performs a specific multimedia software under the control of a purified version of an operating system. The multimedia operation mode class has a plurality of entries, such as music playing mode, video playing mode, TV broadcasting mode, radio broadcasting mode, and image capturing and exploring mode. At this point, the application 111 may be any program tailored to be executed in the PC mode, or an application specific to a selected sub-mode of the multimedia operation mode class to perform a specific function.

The second processor 120 may be an external processor coupled to the computer system 110. The second processor 120 includes a monitor module 121, such as a watchdog timer to monitor the execution status of the application 111 in the computer system 110. If the execution status of the application 111 is abnormal, the monitor module 121 sends a control signal to a power supply circuit (not shown in figures) of the computer system 110 via the second processor 120 to reboot the computer system 110 and execute the application 111 using the first processor 112 again.

It should be noted that the monitor module 121 may use two possible methodologies to monitor the execution status of the application 111 in the computer system 110. As to the first methodology, the application 111 may be configured to send a live signal to the monitor module 121 of the second processor 120 when a first predetermined time interval is reached. If the monitor module 121 does not receive the live signal from the application 111 within a second predetermined time interval, the monitor module 121 determines that the execution status of the application is abnormal.

As to the second methodology, the monitor module 121 may be configured to send a confirmation signal to the application 111 in the computer system 110 when a first predetermined time interval is reached, and the application 111 may be configured to return a surviving signal to the monitor module 121 in response to the confirmation signal. If the monitor module 121 does not receive the surviving signal from the application 111 within a second predetermined time interval, the monitor module 121 determines that the execution status of the application becomes abnormal.

Figure 2:
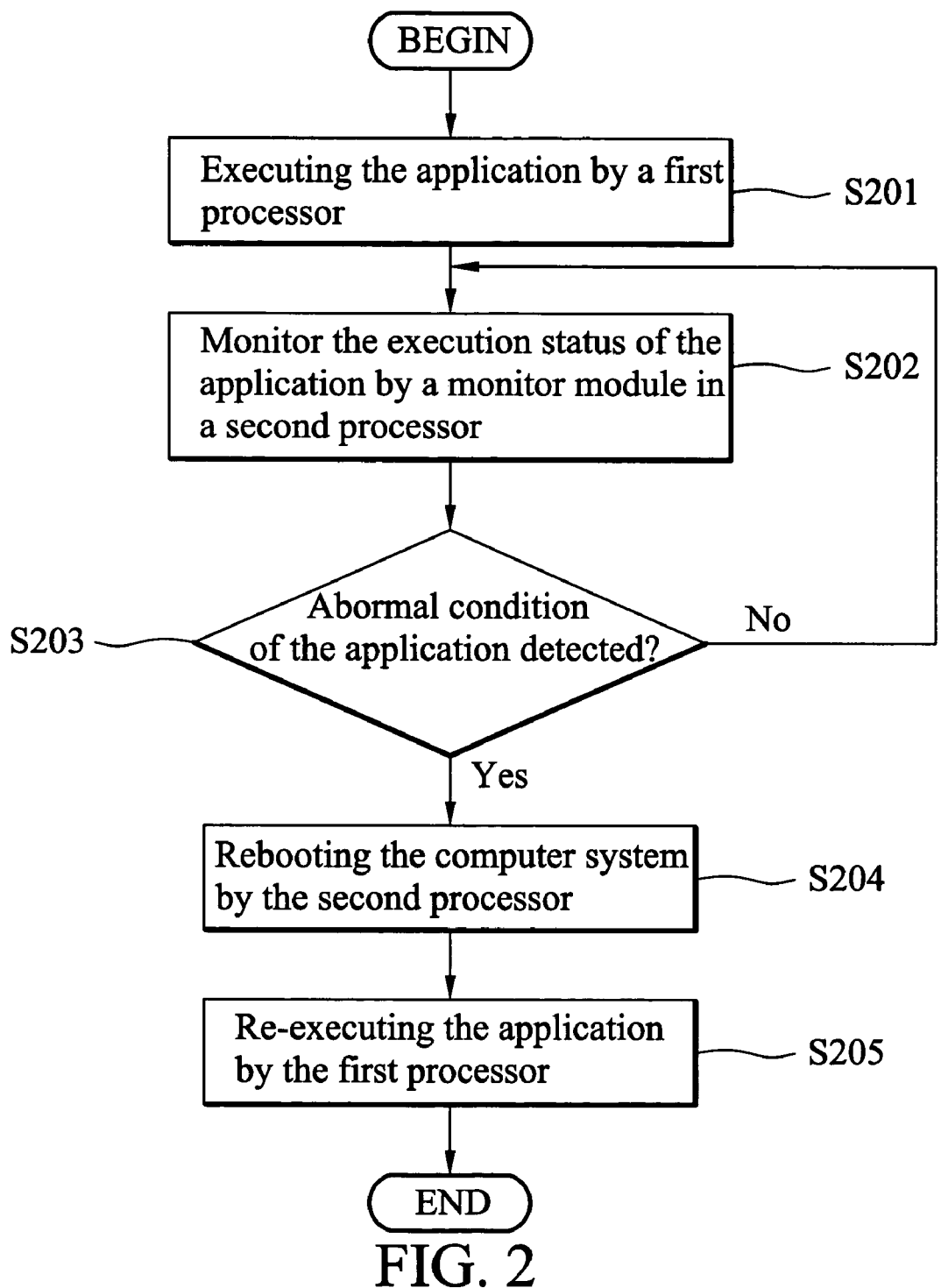
FIG. 2 is a flowchart showing the process of the application management method according to the present invention.

FIG. 2 shows the process of the application management method according to the present invention.

First, in step S201, the first processor 112 of the computer system 110 executes the application 111. Then, in step S202, the monitor module 121 of the second processor 120 monitors the execution status of the application 111 in the computer system 110. At this point, if the execution status is normal (No in step S203), the process returns to step S202, and the monitor module 121 continues to monitor the execution status of the application 111.

Similarly, the present invention uses two methodologies to monitor the application. If the first methodology is adopted, the application 111 may be configured to send a surviving signal to the monitor module 121 when a first predetermined time interval is reached. If the monitor module 121 does not receive the surviving signal from the application 111 within a second predetermined time interval, the monitor module 121 determines that the execution status of the application becomes abnormal. If the second methodology is adopted, the monitor module 121 may send a confirmation signal to the application 111 when a first predetermined time interval is reached, and the application 111 may be configured to return the surviving signal to the monitor module 121 in response to the confirmation signal. If the monitor module 121 does not receive the surviving signal from the application 111 in the second predetermined time interval, the monitor module 121 determines that the execution status of the application becomes abnormal.

If the execution status of the application 111 becomes abnormal (Yes in step S203), in step S204, the monitor module 121 sends a control signal to the power supply circuit of the computer system 110 to reboot the computer system 110. Thereafter, in step S205, the first processor 112 of the computer system 110 automatically executes the application 111 again.

As a result, by using the application management system and method according to the present invention, the execution status of the computer system application can be monitored by using an external microprocessor, thereby actively rebooting the computer system and executing the application again if the execution status of the application is abnormal.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An application management method for use in a computer system operating under the control of a purified version of an operating system, where the purified version of the operating system is one of a plurality of modes of the operating system and enables the computer system operating in a one of the plurality of modes class, comprising the steps of:

providing a first processor to execute an application under the one mode class controlled by the purified version of the operating system;

providing a second processor comprising a monitor module to monitor an execution status of the application;

enabling the computer system to reboot by the second processor if the execution status of the application is abnormal; and after the computer system reboots, enabling the computer system to operate in the one mode that was active at the time of abnormal execution by executing the purified version of the operating system, and re-execute the application by the first processor.

2. The application management method as claimed in claim 1, further the step of enabling the computer system to reboot comprising sending a control signal to a power supply circuit of the computer system by the second processor to reboot the computer system if the execution status of the application is abnormal.

3. The application management method as claimed in claim 1 wherein the application is configured to send a surviving signal to the monitor module when a first predetermined time interval is reached, and the monitor module determines that the execution status of the application becomes abnormal if the surviving signal is not received from the application in a second predetermined time interval.

4. The application management method as claimed in claim 1, wherein the monitor module is configured to send a confirmation signal to the application when a first predetermined time interval is reached, the application is configured to return a surviving signal to the monitor module in response to the confirmation signal, and the monitor module determines that the execution status of the application becomes abnormal if the surviving signal is not received from the application within a second predetermined time interval.

5. An application management system for use in a computer system operating under the control of a purified version of an operating system, where the purified version of the operating system is one of a plurality of modes of the operating system and enables the computer system operating in a one of the plurality of modes class, comprising:

a first processor to execute an application under one mode class controlled by the purified version of the operating system; and a second processor comprising a monitor module to monitor execution status of the application, and enable the computer system to reboot if the execution status of the application is abnormal, wherein after the computer system reboots, the first processor further enables the computer system to operate in the one mode that was active at the time of abnormal execution by executing the purified version of the operating system, and re-execute the application.

6. The application management system as claimed in claim 5 wherein if the execution status of the application is abnormal, the second processor sends a control signal to a power supply circuit of the computer system to reboot the computer system.

7. The application management system as claimed in claim 5 wherein the application is configured to send a surviving signal to the monitor module when a first preset time interval is reached, and the monitor module determines that the execution status of the application becomes abnormal if the surviving signal is not received from the application within a second predetermined time interval.

8. The application management system as claimed in claim 5 wherein the monitor module is configured to send a confirmation signal to the application when a first predetermined time interval is reached, the application is configured to return a surviving signal to the monitor module in response to the confirmation signal, and the monitor module determines that the execution status of the application becomes abnormal if the surviving signal is not received from the application within a second predetermined time interval.

9. An application management method for use in a computer system, comprising the steps of:
    providing a first processor to execute an application;
    providing a second processor comprising a monitor module to monitor an execution status of the application; and
    enabling the computer system to reboot by the second processor if the execution status of the application is abnormal, wherein the computer system reboots to the mode of operation execution at the time of abnormal operation; and;
    wherein the monitor module is configured to send a confirmation signal to the application when a first predetermined time interval is reached, the application is configured to return a surviving signal to the monitor module in response to the confirmation signal, and the monitor module determines that the execution status of the application becomes abnormal if the surviving signal is not received from the application within a second predetermined time interval.

10. The application management method as claimed in claim 9, further comprising executing of the application again by the first processor after the computer system reboots.

11. The application management method as claimed in claim 9, further the step of enabling the computer system to reboot comprising sending a control signal to a power supply circuit of the computer system by the second processor to reboot the computer system if the execution status of the application is abnormal.

12. The application management method as claimed in claim 1 wherein the application is specific to perform a function in accordance with an entry of an operation mode class under the control of the purified version of the operating system.

13. The application management method of claim 9, wherein the computer system is configured to operate in any one of a plurality of modes of operation, and the application is configured to operate in one of the plurality of modes of operation.

14. The application management method of claim 1, wherein the multiple modes includes one normal PC mode and at least one sub-mode.

* * * * *